No. 743,802.

Patented November 10, 1903.

UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 743,802, dated November 10, 1903.

Application filed January 30, 1903. Serial No. 141,206. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in pigments and processes of making the same; and it consists, respectively, in the novel product and the series of steps more fully set forth in the specification, and pointed out in the claims.

The composition in the present instance consists of barium carbonate and aluminium hydrate or barium carbonate, aluminium hydrate, and barium sulfate.

Broadly stated, the process contemplates the precipitation of barium carbonate and aluminium hydrate or barium carbonate, aluminium hydrate, and barium sulfate from solutions of barium compounds, barium salts, aluminium salts, and the carbonate or the carbonate and hydrate of an alkali metal.

The manner and conditions of bringing the solutions together and the various salts of the respective metals applicable in the accomplishment of my purpose are subject to a wide range of adaptability.

One illustration of my process is as follows: To a solution of barium hydrate is added a solution of sodium carbonate. Barium carbonate is precipitated and sodium hydrate formed in solution. The latter is then added to a solution of aluminium sulfate, when aluminium hydrate is precipitated and sodium sulfate formed in solution. The reactions may be expressed as follows:

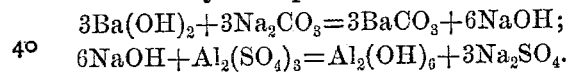

It should be observed that instead of adding the solution of aluminium sulfate or other aluminium salt to the sodium hydrate the operation should be reversed and the sodium hydrate or alkali hydrate should be added to the aluminium-salt solution. The reason for this is that aluminium hydrate is soluble in an excess of alkali hydrate and that when the aluminium-salt solution is added, especially in divided portions, to the alkali hydrate the excess of the latter acts as a solvent on the precipitate, forming an aluminate of soda. In the reverse order of bringing the solutions together the precipitate of aluminium hydrate is unacted upon by the aluminium-salt solution present in excess. Obviously it will also be necessary to always keep the aluminium-salt solution somewhat in excess of the alkali-metal hydrate.

A second illustration of my process is as follows: To a solution of barium chlorid and a solution of aluminium chlorid, which are mixed togther, is added a solution of sodium carbonate sufficient in quantity to completely react with the barium chlorid and aluminium chlorid, when there is precipitated barium carbonate and aluminium hydrate and sodium chlorid formed in solution. The reaction in this instance may be expressed as follows:

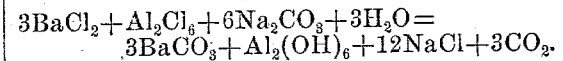

Instead of six molecular equivalents of sodium carbonate three molecular equivalents can be used and six molecular equivalents of sodium hydrate substituted for the three discarded equivalents of sodium carbonate, as shown herewith:

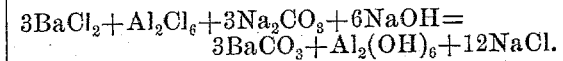

Referring back to the first in order of the illustrated equations, it will be seen that a final solution of sodium sulfate remained as a by-product of the reactions. If to this solution is added an equivalent solution of a soluble barium salt, we would have a precipitate formed of barium sulfate, the combined product in which case would then consist of the precipitates of barium carbonate, aluminium hydrate, and barium sulfate. If the additional equivalent of barium-salt solution were the sulfid compound of this metal, the reaction could be expressed thus:

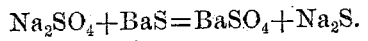

The form of my process in which the extended pigment is produced can also be arranged to bring the solutions together, as follows: Solutions of three equivalents of barium hydrate, three equivalents of barium chlorid, three equivalents of sodium carbonate, and one equivalent aluminium sulfate are brought together simultaneously, when there are precipitated three equivalents of barium sulfate, three equivalents of barium carbonate, one equivalent of aluminium hydrate, and six equivalents of sodium chlorid formed in solution, the reactions being as follows:

$$3Ba(OH)_2 + 3BaCl_2 + 3Na_2CO_3 + Al_2(SO_4)_3 = \\ 3BaSO_4 + 3BaCO_3 + Al_2(OH)_6 + 6NaCl.$$

It will be seen that when the additional barium-salt solution used is the sulfid compound it is best added after the sodium sulfate is formed in reaction and preferably not used when the solutions are brought together simultaneously, in which latter case a barium-salt solution—such as the chlorid, acetate, and nitrate—are better adapted.

It may be remarked here that doubling the quantity of barium-hydrate solution is not adapted to take the place of the portion of barium-salt solution mentioned, as the chlorid, acetate, nitrate, and sulfid. For instance, if we used six molecular equivalents of barium hydrate instead of three of barium hydrate and three of barium chlorid the final solution remaining would be sodium hydrate, which would act as a solvent of the precipitated aluminium hydrate and of course dissolve it. The reactions in illustration of this feature are as follows:

$$6Ba(OH)_2 + 3Na_2CO_3 + Al_2(SO_4)_3 = \\ 3BaSO_4 + 3BaCO_3 + Al_2(OH)_6 + 6NaOH.$$

As the sodium hydrate formed in final solution would dissolve the aluminium hydrate previously formed and precipitated, this manner and form of bringing the solutions together is to be avoided. The additional equivalents of barium-salt solution can, however, be used in the form of barium hydrate if the solutions are brought together in the manner as where barium sulfid is indicated, provided that after the barium carbonate and aluminium hydrate are precipitated the resultant solution of sodium sulfate is drained into a separate container and there mixed with the additional equivalents of barium-hydrate solution. The sodium hydrate thereby formed in reaction could not act upon the aluminium-hydrate precipitate, the same being in a separate container. The precipitate of barium sulfate could then be recovered and mixed by any suitable means with the barium carbonate and aluminium hydrate formed in the other container. The following equation will make this clear:

$$3Ba(OH)_2 + 3Na_2CO_3 = 3BaCO_3 + 6NaOH;$$
$$6NaOH + Al_2(SO_4)_3 = Al_2(OH)_6 + 3Na_2SO_4.$$

The sodium-sulfate solution is drained into a separate container and mixed with three equivalents of barium-hydrate solution, thus:

$$3Na_2SO_4 + 3Ba(OH)_2 = 3BaSO_4 + 6NaOH,$$

the precipitates being recovered and mixed as before stated.

Obviously I may substitute the carbonates and hydrates of other alkali metals for those of sodium without in any way departing from the principle of my invention. I may also invoke the doctrine of chemical equivalents wherever the same may be applicable.

As a commercial illustration of my process the following may be cited, referring to that form shown in the first reaction illustrated: Separate aqueous solutions of the respective salts are prepared in the proportions specified. Barium hydrate, five hundred and thirteen (513) pounds; sodium carbonate, three hundred and eighteen (318) pounds; aluminium sulfate, three hundred and forty-two (342) pounds. The barium-hydrate and sodium-carbonate solutions are brought together, when five hundred and ninety-one (591) pounds of barium carbonate is precipitated and two hundred and forty (240) pounds of sodium hydrate formed in solution. The latter solution is then added to the aluminium-sulfate solution, when one hundred and fifty-six (156) pounds of aluminium hydrate is precipitated and four hundred and twenty-six (426) pounds of sodium sulfate formed in solution. If the extended pigment is desired, five hundred and seven (507) pounds of barium sulfid in solution is added to the sodium-sulfate solution, when six hundred and ninety-nine (699) pounds of barium sulfate is precipitated and two hundred and thirty-four (234) pounds of sodium sulfid formed in final solution. The pigments are recovered and intimately mixed by any suitable means. The calculation weights given are based on anhydrous salts. For hydrous salts the proportions should be correspondingly increased. The two hundred and thirty-four (234) pounds of sodium-sulfid solution remaining when subjected to evaporation, crystallizing with nine molecules of water, will form seven hundred and twenty (720) pounds of crystals.

By the term "recovering" as used in the claims I mean not only the recovery of the precipitates from the solutions remaining after their formation, but their subsequent intimate mixture, where such mixture is necessary or essential.

While the ultimate product of the process herein set forth is a mixture of barium carbonate, aluminium hydrate, and barium sulfate, it is to be observed that this product may be associated with coloring-matter, such as anilin dyes, and, in fact, is suitable for use as a base or mordant for all precipitable organic colors. Such colors my be introduced simultaneously with any of the reagents forming the ultimate product referred to and be precipitated therewith.

Having described my invention, what I claim is—

1. The process of making pigment which consists in mixing barium hydrate, the carbonate of an alkali metal, and a soluble salt of aluminium, and recovering the resulting precipitates, substantially as set forth.

2. The process of making pigment which consists in mixing barium hydrate, the carbonate of an alkali metal, and aluminium sulfate, and recovering the resulting precipitates, substantially as set forth.

3. The process of making pigment which consists in mixing barium hydrate, sodium carbonate, and aluminium sulfate, and recovering the resulting precipitates, substantially as set forth.

4. The process of making pigment composed of barium carbonate and aluminium hydrate which consists in bringing together solutions of a compound of barium, a suitable salt of aluminium, and the carbonate of an alkali metal, and recovering the resulting precipitates, substantially as set forth.

5. The process of making pigment which consists in mixing a solution of a compound of barium, and a suitable salt of aluminium, with the carbonate and hydrate of an alkali metal, and recovering the resulting precipitates, substantially as set forth.

6. The process of making pigment which consists in mixing solutions of barium hydrate, a soluble salt of barium, the carbonate of an alkali metal and a soluble salt of aluminium, and recovering the resulting precipitates, substantially as set forth.

7. The process of making pigment which consists in mixing solutions of barium hydrate, a salt of barium, the carbonate of an alkali metal, and aluminium sulfate, and recovering the resulting precipitates, substantially as set forth.

8. The process of making pigment which consists in mixing solutions of barium hydrate, a salt of barium, sodium carbonate, and a salt of aluminium, and recovering the resulting precipitates, substantially as set forth.

9. The process of making pigment which consists in mixing solutions of barium hydrate, barium chlorid, sodium carbonate, and aluminium sulfate, and recovering the resulting precipitates, substantially as set forth.

10. The process of making pigment which consists in mixing a solution of barium hydrate with the carbonate of an alkali metal, then adding the resulting solution to a solution of a salt of aluminium, and recovering the resulting precipitates, substantially as set forth.

11. The process of making pigment which consists in mixing a solution of barium hydrate with the carbonate of an alkali metal, then adding the resulting solution to a solution of aluminium sulfate, and recovering the resulting precipitates, substantially as set forth.

12. The process of making pigment which consists in mixing a solution of barium hydrate with the carbonate of an alkali metal, adding the resulting solution to a solution of aluminium sulfate, then adding barium sulfid to the final solution, and recovering the resulting precipitates, substantially as set forth.

13. The process of making pigment which consists in mixing a solution of a compound of barium, a salt of aluminium, and the carbonate of an alkali metal, and recovering the resulting precipitates, substantially as set forth.

14. The process of making pigment which consists in mixing solutions of a compound of barium, a suitable salt of aluminium, and sodium carbonate, and recovering the resulting precipitates, substantially as set forth.

15. A pigment containing a mixture of precipitated barium carbonate, and aluminium hydrate, substantially as set forth.

16. A pigment having as a constituent a mixture of barium carbonate, and aluminium hydrate, substantially as set forth.

17. A composition of matter suitable as a base for pigments and colors, comprising a mixture of barium carbonate, aluminium hydrate, and barium sulfate, substantially as set forth.

18. A pigment composed of a mixture of precipitated barium carbonate, aluminium hydrate, and barium sulfate, substantially as set forth.

In testimony whereof I affix my signature in presence of two witnesses.

WILLIAM J. ARMBRUSTER.

Witnesses:
   EMIL STAREK,
   G. L. BELFRY.